United States Patent [19]

Hsieh et al.

[11] Patent Number: 4,676,889

[45] Date of Patent: Jun. 30, 1987

[54] SOLVENT EXTRACTION PROCESS FOR RECOVERING BITUMEN FROM TAR SAND

[75] Inventors: C. Richard Hsieh, San Rafael; Roger K. Clifford, Danville, both of Calif.

[73] Assignee: Chevron Research Company, San Francisco, Calif.

[21] Appl. No.: 584,022

[22] Filed: Feb. 27, 1984

[51] Int. Cl.$^4$ ................................................ C10G 1/04
[52] U.S. Cl. .................................... 208/390; 208/391
[58] Field of Search ............... 208/11 LE, 8 LE, 390, 208/391

[56] References Cited

U.S. PATENT DOCUMENTS 2,921,010  1/1960  Sherborne .......................... 208/390
3,070,541 12/1962  Price .................................. 208/390
4,399,314  8/1983  Child .................................. 208/390

Primary Examiner—Asok Pal
Attorney, Agent, or Firm—S. R. LaPaglia; T. G. DeJonghe; Q. Todd Dickinson

[57] ABSTRACT

Bitumen recovered from tar sand by direct solvent extraction followed by washing of the sand tailings with countercurrent solvent flow and a solvent/aqueous phase separation step to recover solvent and residual bitumen.

15 Claims, 3 Drawing Figures

SOLVENT EXTRACTION PROCESS FOR RECOVERING BITUMEN FROM TAR SAND

BACKGROUND OF THE INVENTION

Tar sand, also referred to as oil sand and bituminous sand, is a naturally occurring sedimentary rock which contains extractable amounts of bitumen or other very heavy oils in association with sand grains. The rock may be consolidated or unconsolidated. These terms refer to the presence or absence, respectively, of the structural integrity of the mineral component of the rock independent of the adhesive effect of the organic component. Some tar sand deposits, such as those found in Canada, are characterized by an envelope of water, sometimes called connate water, surrounding the sand particles. The water envelope in turn is surrounded by a film of bitumen. Other deposits, particularly those in the United States such as, for example, those from the Sunnyside deposit in Utah, lack the water envelope. The extraction process chosen to remove the bitumen will depend in part on whether the water envelope is present or absent. For example, a hot water separation process has been used extensively for the water-wet tar sands found in Canada. However, this approach is not effective for oil-wet tar sands.

In some processes for recovering the bitumen from the tar sand, the raw feed is ground to a particle size sufficient to allow separation of the bitumen from the sand grains. This approach requires grinding the feed to a relatively fine particle size distribution. The additional grinding necessary to liberate the sand grains translates into increased energy requirements. The ground material is passed through a froth flotation chamber to recover the bitumen. A collector such as kerosene is usually present to facilitate the separation. Such processes generally leave a significant part of the bitumen with the mineral residue. In addition, the kerogen fraction may form an emulsion with water which is not easily separated. Solid fines, especially clay particles if they are present in the feed, are usually carried along with the bitumen making further separation steps necessary.

In other processes an organic solvent is used to dissolve the bitumen. However, solvent loss is usually high in such processes making them economically unattractive.

SUMMARY OF THE INVENTION

The present invention uses an organic solvent to recover most of the bitumen from the ground tar sand feed. The mineral residue is washed in at least one, and preferably several, washing steps which recover the solvent and any bitumen remaining with the mineral residue. By passing the solvent recovered from each wash stage back to a preceding stage, a countercurrent solvent flow in relation to the movement of the mineral residue is established which beneficiates the bitumen and solvent continuously forward in the process.

In its broadest aspect the present invention concerns a process for recovering bitumen from tar sand which comprises:

(a) preparing a mixture containing divided tar sand and an organic solvent wherein the ratio of the solvent to the bitumen in the tar sand is sufficient to form a bitumen/solvent phase with a viscosity low enough to facilitate the physical separation of a significant portion of said bitumen/solvent phase from the mineral matrix of the tar sand;

(b) separating by physical means at least a portion of the bitumen/solvent phase from the mineral matrix;

(c) mixing the separated mineral matrix of step (b) with additional solvent in a washing stage to recover bitumen remaining with the mineral matrix;

(d) introducing the recovered solvent/bitumen mixture from wash step (c) back into step (a);

(e) recovering organic solvent from the mineral matrix of step (c) using an aqueous/organic solvent phase separation wherein the majority of the mineral matrix remains with the aqueous phase;

(f) recycling the solvent recovered from the phase separation of step (e) back to the washing step of (c);

(g) separating bitumen from the bitumen/solvent phase of step (b); and (h) returning solvent collected from step (g) back to step (a).

In carrying out the process of the subject invention, the water used in the aqueous/solvent phase separation may be added during the washing step or, alternatively, during the preparation of the organic solvent/tar sand mixture of step (a). In addition, some water is normally present in the raw tar sand feed. This is especially true of tar sand which contains connate water. When large amounts of water are naturally present in the tar sand, it may not be necessary to add additional water during the processing. As will be explained below, the percent of water relative to solvent increases with each stage as the residual solvent is drawn off and recycled to previous stages. When additional water is added to the process, it may be added as hot water or as steam for the additional purpose of raising the temperature of the solvent/tar sand mixture.

DETAILED DESCRIPTION OF THE INVENTION

The present invention is especially suitable for use with tar sands containing little or no connate water, sometimes called oil wet tar sands. However, the process may also be used with tar sands containing significant amounts of connate water, i.e., water-wet tar sands. The process of this invention is particularly advantageous when the tar sand contains significant amounts of fine clay particles. In processes using water extraction, both the bitumen and clay tend to form a colloid which is difficult to separate. In the process described herein, most of the fines become concentrated in the aqueous phase of the water/solvent separation step during cleanup of the mineral residue. Most of the bitumen has already been removed along with the majority of the solvent prior to this phase separation step. As a result very little bitumen, usually less than 5% of the total bitumen recovered, passes through this stage. This small amount of bitumen and the relatively high concentration of the fines simplifies the additional treatments needed to separate the residual bitumen fraction.

Figure 1:
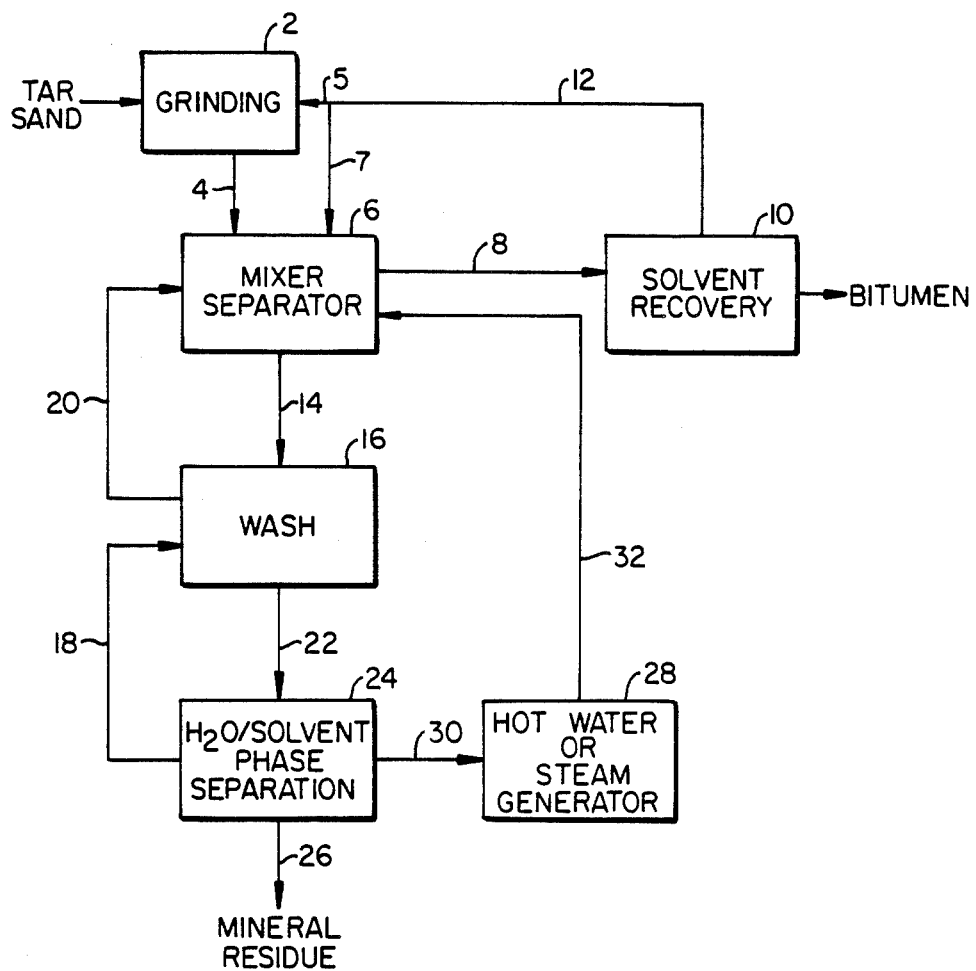
FIG. 1 is a schematic representation of the basic process of the invention.

Turning to the drawings, FIG. 1 is a schematic diagram illustrating the basic process. Tar sand recovered from the mine site is crushed (not shown) and ground in a mill 2 or other suitable grinding device. Unlike many conventional processes, such as those using flotation, the tar sand need not be ground to a sufficient particle size to separate the sand grains and release the bitumen. Generally a particle size up to about ¼ inch is suitable for use in this process. Following grinding, the tar sand is sent via 4 to a mixer-separator 6. Solvent suitable for reducing the viscosity of the tar sand may be added to the tar sand either during grinding in the mill 2 or in the mixer-separator via conduits 5 or 7, respectively. Sufficient solvent must be added to cause a significant deterioration of the tar sand particles due to the loss in adhesive force of the bitumen. Optionally, hot water or steam generated from water recovered by the process from the tar sand may be added via conduit 32 to heat the mixture and further reduce the viscosity of the bitumen/solvent phase. If insufficient water is naturally present in the feed, additional water may be added during grinding or into the mixer-separator.

Following thorough mixing of the tar sand and the solvent, the mixture is allowed to physically separate into a liquid and solid phase. This may be carried out by simple gravity settling or aided by centrifugation, filtering, etc. The solvent and bitumen are drawn off by 8 and pass to the solvent recovery system 10 which may be a distillation column. The recovered solvent is recycled via 12 back for mixture with additional fresh tar sand feed.

The solids phase consisting of mineral residue, water, residual bitumen and solvent is carried by 14 to the wash stage 16. Solvent carried by conduit 18 is used to wash the residue. The solids are separated from the liquid in much the same manner as in the preceding stage. The separated organic liquid which is mostly solvent and some bitumen are carried by 20 back to the mixer separator 6. The solids will contain most of the water from the previous stages and some solvent. This residue passes by 22 to a phase separation stage 24 which recovers the remaining solvent and bitumen. A particularly preferred method of carrying out this step is by froth flotation. The solvent recovered is sent back to the wash stage via 18. The mineral residue and some water are removed at 26. The majority of the water is sent to a hot water or steam generator 28 via 30 and recycled to the mixer-separator via 32.

Figure 2:
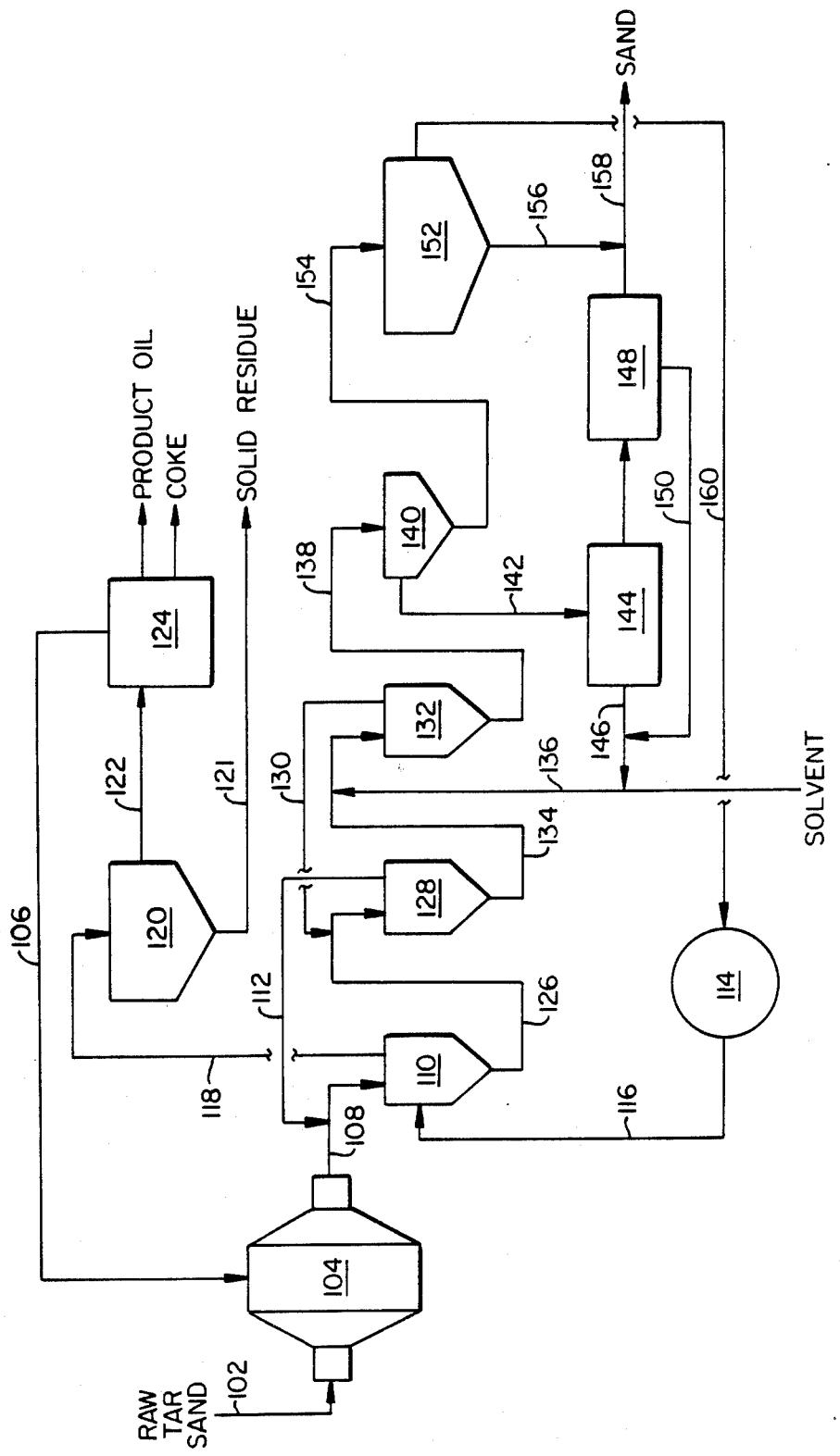
FIG. 2 is a more detailed diagram of one embodiment of the process of the invention.

FIG. 2 illustrates schematically one preferred method for carrying out the invention. In this embodiment the raw crushed tar sand is carried by feed conduit 102 to a semi-autogenous mill 104. In the mill, solvent is added via 106 at a ratio of about 2.5 parts of solvent to 1 part of bitumen. In the mill the tar sand is ground to a maximum particle size of about ¼ inch and removed via 108. The ground tar sand is carried to mixer-separator 110. Additional solvent is added to the tar sand by recycle conduit 112. Steam is added to the mixer-separator from steam boiler 114 via steam conduit 116. As the tar sand granules disintegrate, the solvent and bitumen will form an organic liquid phase which will separate from the water and mineral component of the tar sand. This solvent/bitumen phase is drawn off by conduit 118 and carried to settling tank 120 where additional solids are removed as sediment via conduit 121. This sediment may be centrifuged or dried to recover additional solvent. The solvent/bitumen is carried by 122 to an upgrading unit 124 which consists of a coker and an accompanying fractionation tower which is also used to recover solvent for recycle via 106 back to the mill 104.

The solids recovered from the mixer-separator 110 are recovered as underflow via conduit 126 and carried to a first washing stage 128. A wash liquid is added to the incoming underflow via conduit 130. The wash liquid consists primarily of solvent/bitumen recovered from the second washing stage 132. However, some water will also be present in the wash liquid. The solids/water phase is allowed to settle from the bitumen/solvent phase in the first wash stage 128. The bitumen/solvent is drawn off and recycled via 112 back to the tar sand entering the mixer-separator 110. The solids and water phase are withdrawn and pass via conduit 134 to the second washing stage 132. Additional solvent used to wash the residue is added via solvent conduit 136.

In the second washing stage 132, the solvent phase is withdrawn with any dissolved bitumen via conduit 130 for recycle to the first washing stage. The solids and water are recovered by conduit 138 and sent to a scavenger float tank 140 where residual solvent/bitumen is removed by froth flotation. The float fraction, i.e., solvent/bitumen, is carried by conduit 142 to a centrifuge 144 where additional fines are removed. The cleaned solvent may be recycled to the second wash step 132 via conduits 146 and 136. The solids removed by the centrifuge pass to a drier 148 where additional solvent may be recovered and recycled via conduit 150. The sink fraction from the flotation tank is carried to thickening tank 152 via conduit 154 where the solids are separated from the water by settling. Thickeners may also be added to agglomerate the solids which are removed by 156 and mixed with solids from the drier 148. The mineral residue, mostly sand, passes by conduit 158 to a tailings pond or other appropriate disposal site. Water recovered from the thickening tank 152 is recycled to the steam generator 114 by means of conduit 160.

In viewing the process as presented in FIGS. 1 and 2, most of the bitumen and solvent are removed from the tar sand in the mixer-separator stage. The wash stages and flotation step serve to recover only residual bitumen and solvent left with the underflow from the mixer-separator stage. It will also be seen that the process scheme by recirculating the wash liquid from subsequent steps concentrates the organic material in the opposite direction from the solids/water phase. Thus a countercurrent solvent/bitumen - water/solids system is established. By the time the tailings undergo froth flotation in the flotation cell, i.e., the phase separation step, very little bitumen and only a small amount of solvent remain. This eliminates a significant problem found in some prior art processes where an emulsion is formed in the flotation cell which is difficult to break. In the present process so little bitumen remains that separation is not a significant problem. The solvent recovered by flotation may contain colloidal water; since this liquid is simply recycled as wash liquid, the presence of water is not a problem.

Figure 3:
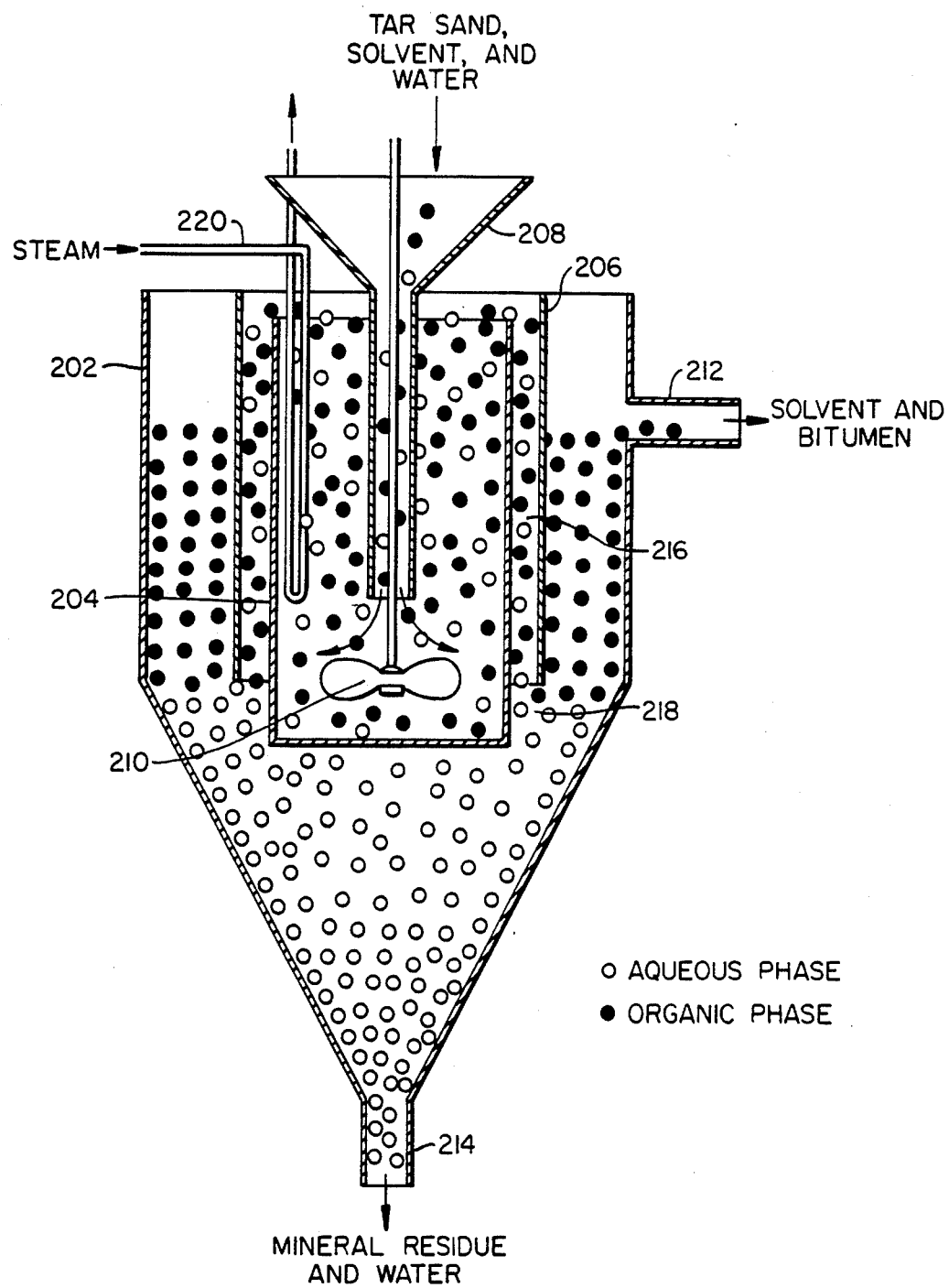
FIG. 3 illustrates a design for the mixer-separator used in carrying the process of the invention.

A device suitable for use as the mixer-separator or for carrying out the wash steps is illustrated in FIG. 3. The device consists of an outer tank 202 and an inner tank 204. A circular baffle 206, open at the bottom and top, forms a concentric barrier between the inner and outer tanks. The inner tank contains a feed dipleg 208 and a mixer 210. The outer tank has an overflow outlet 212 and an underflow outlet 214.

In operation a mixture of tar sand, solvent, and water is introduced into the feed dipleg 208. The feed dipleg discharges the mixture into the bottom of the inner tank 204 where it is thoroughly mixed using mixer 210. The mixture overflows the top of the inner tank into the space 216 between the outer wall of the inner tank and the inner wall of the concentric baffle 206. The mixture flows downward between the outer wall of the inner tank and the baffle into the separation zone 218 of the outer tank. In this zone of the outer tank the aqueous phase containing most of the solids separates from the organic phase comprising the bitumen and solvent. The organic phase flows upward and is recovered by the overflow outlet 212. The aqueous phase along with the mineral residue settles to the bottom and exits via the underflow outlet 214. In the drawing, steam is shown passing through a steam coil 220 to raise the temperature of the mixture. Various other devices may be used to carry out the mixer-separation and washing steps used in the process. FIG. 3 represents only one means for accomplishing the steps shown in FIGS. 1 and 2.

The solvent employed for lowering the viscosity of the bitumen may be any organic solvent which is not miscible with water and is capable of dissolving the bitumen. Preferably the solvent will have a specific gravity less than water, however schemes within the scope of the invention may also be contemplated wherein the solvent has a specific gravity greater than water. Suitable solvents include paraffinic hydrocarbons such as propane, butane, pentane, hexane, etc.; branched hydrocarbons such as methyl pentane; aromatic hydrocarbons such as benzene and toluene; cyclic hydrocarbons such as cyclohexane; oxygenated hydrocarbons including ketones and aldehydes; and olefinic hydrocarbons such as butene and pentene. Halogenated hydrocarbons such as methylene chloride may be desirable because they lack the flammability problem associated with most other hydrocarbons. The solvent will commonly consist of a mixture of various hydrocarbons; often the mixture will be a cut from a distillation or fractionation column. Depending on the process the solvent may be a relatively low-boiling material such as propane. Usually suitable solvents or solvent mixtures will have a normal boiling range below about 650° F. In the process shown in FIG. 2 kerosene has been found to be a particularly useful solvent. The amount of the solvent added depends on a number of factors such as the specific solvent employed, the temperature of the mixture, the particle size of the ore, the type and quality of the ore, etc. Usually only enough solvent need be added to liberate the bitumen, i.e. lower the viscosity sufficiently to separate the bitumen from the sand grains, and to form an organic phase which may be recovered separately from the mineral residue (sand grains). Normally this will be at least two or three parts of solvent per one part of bitumen in the rock. Since in most commercial processes at least some and preferably most of the solvent will be recycled, solvent used in excess of that amount needed to separate the bitumen only increases the cost associated with separating the bitumen and solvent. Therefore, it is generally desirable to use the minimum amount of solvent necessary to liberate the bitumen from the ore particles.

As noted above, the solvent may be mixed with the tar sand initially either in the grinding step or in the mixer-separation stage. It has been found that addition of at least 4% by weight of solvent during the grinding of the tar sand is advantageous since the solvent aids in the break-up of the tar sand particles. Higher levels of solvent addition usually translate into improved grinding. Therefore solvent additions of 2 or 3 parts of solvent to 1 part of bitumen are usually preferred. The grinding may be accomplished using known methods and equipment such as with a semi-autogenous mill, an autogenous mill, a ball mill, a rod mill, a stirred ball mill, etc.

Prior to the grinding steps some initial size reduction, referred to as crushing, usually must take place. The crushing may be accomplished using known methods such as with impact crushers, feeder breakers, cone crushers, gyratory crushers, jaw crushers, hammermills, bucketwheel excavators, etc. In the case of unconsolidated tar sand the material may be suitable for processing as it is extracted from the mine site. Further reduction of unconsolidated rock, if necessary, may be accomplished using known methods such as with a rotating drum. The temperature of the solvent and tar sand mixture will have an effect on the amount of solvent required to accomplish the objectives of the process. Since the presence of solvent is intended to lower the viscosity of the bitumen by either partially or completely dissolving the bitumen, the ability of the solvent to dissolve the bitumen is a primary parameter of the invention. Higher temperatures generally increase solvency and also lower viscosity. Therefore it is usually desirable to raise the temperature of the solvent/tar sand mixture. As shown in the figures, this may be accomplished by adding either hot water or steam to the mixture. A temperature of between about 100° F. and about a 200° F. represents a generally preferred range but temperatures higher or lower may also be used.

Other materials may also be added to the mixture during the process. Particularly during clean-up and washing of the mineral residue, it may be desirable to add dispersing or wetting agents. Agglomerating agents and flocculating agents may be advantageous, particularly in the phase separation step following the washing stages.

An advantage of the present process is that the solvent/bitumen mixture recovered from the mixer-separator stage may be passed directly to a coking step with only minimal treatment to remove some fines. The coking step as shown in FIG. 2 may be used to recover the solvent for recycle back into the process. Unlike many prior art processes, this solvent/bitumen mixture contains very little water and may be passed directly to the coker.

In carrying out the process disclosed herein, more than 80% of the bitumen is recovered in the mixer-separator stage. If conducted according to the embodiment shown in FIG. 2, in excess of 95% of the bitumen is recovered with the overflow stream from the mixer-separator. In addition, the tailings recovered from the froth flotation cell will contain less than 1% bitumen. Thus it will be seen that the process as described is a highly efficient system for recovery of the bitumen.

A further advantage of the process is that very little solvent is lost. Since, as shown in FIG. 2, the solvent is actually a coker cut, a separate solvent recovery system is not required. Except for a small amount of solvent recovered by the drier 148 of FIG. 2, heat is not required to recover the solvent that remains with the underflow from the mixer-separator stage.

What is claimed is:

1. A process for recovering bitumen from tar sand which comprises:
   (a) preparing a mixture containing divided tar sand and an organic solvent wherein the ratio of the solvent to the bitumen in the tar sand is at least 2 parts solvent to 1 part bitumen form a bitumen/solvent phase with a viscosity low enough to facilitate the physical separation of a significant portion of said bitumen/solvent phase from the mineral matrix of the tar sand;

(b) separating by physical means at least a portion of the bitumen/solvent phase from the mineral matrix;

(c) mixing the separated mineral matrix of step (b) with additional solvent in a washing stage to recover bitumen remaining with the mineral matrix;

(d) introducing the recovered solvent/bitumen mixture from wash step (c) back into step (a);

(e) recovering organic solvent from the mineral matrix of step (c) using an aqueous/organic solvent froth flotation phase separation wherein the majority of the mineral matrix remains with the aqueous phase;

(f) recycling the solvent recovered from the phase separation of step (e) back to the washing step of (c);

(g) separating bitumen from the bitumen/solvent phase of step (b); and (h) returning solvent collected from step (g) back to step (a).

2. The process of claim 1 wherein at least 4% by weight of solvent as compared to total feed weight, is added to the tar sand during a grinding step.

3. The process of claim 1 wherein the organic solvent contains at least one solvent selected from the group consisting of a liquid paraffinic hydrocarbon, a branched hydrocarbon, a cyclic hydrocarbon, an aromatic hydrocarbon, an oxygenated hydrocarbon, and an olefinic hydrocarbon.

4. The process of claim 3 wherein the solvent contains a liquid paraffinic hydrocarbon.

5. The process of claim 3 wherein the solvent contains a branched hydrocarbon.

6. The process of claim 3 wherein the solvent contains a cyclic hydrocarbon.

7. The process of claim 3 wherein the solvent contains an aromatic hydrocarbon.

8. The process of claim 3 wherein the solvent contains an oxygenated hydrocarbon.

9. The process of claim 3 wherein the solvent contains an olefinic hydrocarbon.

10. The process of claim 1 wherein the solvent is kerosene.

11. The process of claim 1 wherein the bitumen/solvent phase separated in step (b) is subjected in step (g) to coking of the bitumen/solvent mixture and a hydrocarbon cut is recovered from the coker which is recycled as the solvent of step (h).

12. The process of claim 1 wherein the process has at least two washing steps.

13. The process of claim 1 wherein water is added to the mixture of solvent and tar sand in step (a).

14. The process of claim 1 wherein the temperature of the mixture of the solvent and tar sand in step (a) is between about 100° F. and about 200° F.

15. The process of claim 14 wherein the temperature of the solvent and tar sand is controlled by adding steam to step (a).

* * * * *